(12) United States Patent
Ma

(10) Patent No.: US 7,491,060 B1
(45) Date of Patent: Feb. 17, 2009

(54) PERSPECTIVE PAINTING AID ASSEMBLY

(76) Inventor: Eugene Lung Kee Ma, 8526 New Star Circle, Sacramento, CA (US) 95828

( * ) Notice: Subject to any disclaimer, the term of this patent is extended or adjusted under 35 U.S.C. 154(b) by 563 days.

(21) Appl. No.: 11/255,824

(22) Filed: Oct. 24, 2005

(51) Int. Cl.
*G09B 11/00* (2006.01)

(52) U.S. Cl. ....................................... 434/91

(58) Field of Classification Search ............... 434/81, 434/84, 85, 91, 92; 33/1 K
See application file for complete search history.

(56) References Cited

U.S. PATENT DOCUMENTS

| | | | | |
|---|---|---|---|---|
| 1,514,296 | A | * 11/1924 | McCallum | 33/277 |
| 2,350,068 | A | * 5/1944 | Scheller | 434/91 |
| 2,381,165 | A | * 8/1945 | Hoffman | 434/91 |
| 2,487,690 | A | 11/1949 | Black et al. | |
| 2,571,613 | A | * 10/1951 | Rissland | 434/91 |
| 2,808,758 | A | * 10/1957 | Forster | 353/11 |
| 3,055,120 | A | * 9/1962 | Scott | 434/89 |
| 3,086,296 | A | * 4/1963 | Bergstrom | 434/90 |
| 3,660,903 | A | 5/1972 | Caperton, Jr. | |
| 4,008,528 | A | 2/1977 | Caulfield | |
| 4,689,017 | A | 8/1987 | Lehti | |
| 5,016,357 | A | 5/1991 | Leonard | |
| 5,100,325 | A | * 3/1992 | Cutler | 434/91 |
| D379,371 | S | 5/1997 | Nicholl et al. | |
| 5,673,490 | A | 10/1997 | Hill | |
| 5,720,615 | A | * 2/1998 | Redey | 434/92 |
| 6,579,099 | B1 | 6/2003 | Pipes, Jr. | |
| 6,705,867 | B2 | * 3/2004 | Foght et al. | 434/95 |

* cited by examiner

*Primary Examiner*—Kurt Fernstrom

(57) ABSTRACT

A perspective painting aid assembly includes a plate that has hemispherical shape and a concave inner surface. A vertical support is attached to the plate. A rigid canvas has generally a same size and shape as the inner surface is positionable against and covers the inner surface. A perimeter cover is removably placed adjacent to a perimeter edge of the plate and extends over and along the perimeter edge. The perimeter cover releasably retains the canvas in abutment with the plate. The perimeter cover has an opening therein aligned with the canvas. Art indicia are positioned on the canvas.

8 Claims, 6 Drawing Sheets

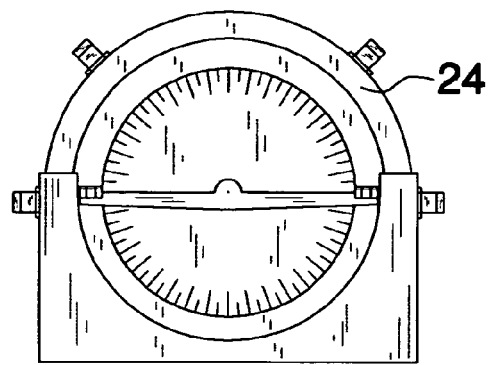
FIG. 3
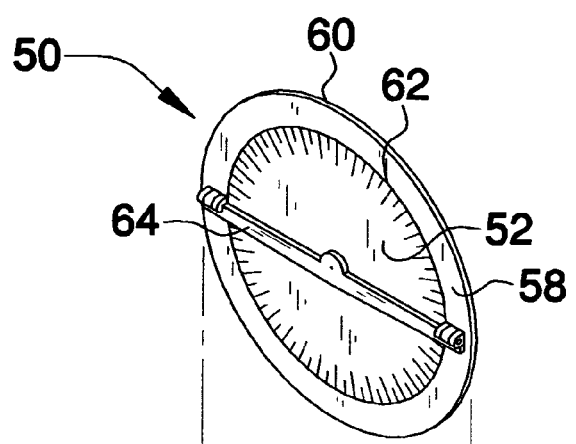
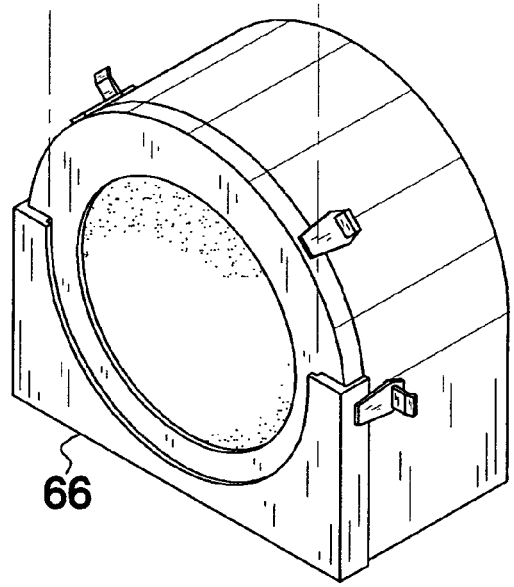
FIG. 4

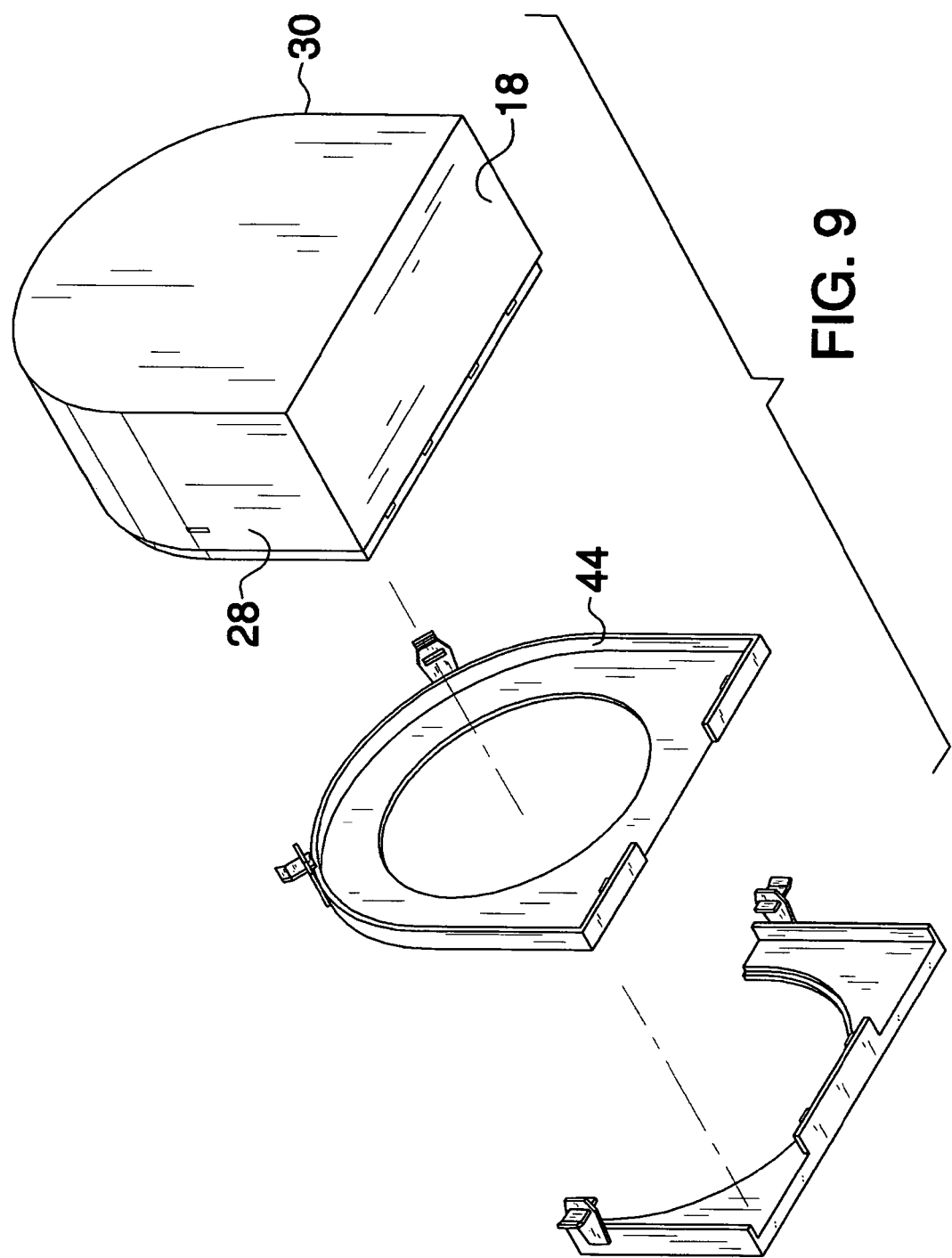

PERSPECTIVE PAINTING AID ASSEMBLY

BACKGROUND OF THE INVENTION

1. Field of the Invention

The present invention relates to perspective aid devices and more particularly pertains to a new perspective aid device for aiding a person in creating curvilinear design so that perspective views may be more easily formed.

2. Description of the Prior Art

The use of perspective aid devices is known in the prior art. U.S. Pat. No. 2,487,690 describes a panel having perspective lines drawn thereon for aiding a person in forming a perspective view of an object. Another type of perspective aid device is U.S. Pat. No. 4,689,017 that again includes a panel having perspective lines thereon along set angles to again aid a person in forming a perspective drawing. Yet another such device is found in U.S. Pat. No. 4,008,528 that is adapted for holding a canvas in an arcuate orientation for aiding a person in drawing in the perspective.

While these devices fulfill their respective, particular objectives and requirements, the need remains for a device that aids a person in drawing objects in a semi-panoramic method. The device should also aid a person in drawing and painting in a curvilinear perspective and the formation of great circles.

SUMMARY OF THE INVENTION

The present invention meets the needs presented above by comprising a plate that has hemispherical shape and a concave inner surface. A vertical support is attached to the plate. A rigid canvas has generally a same size and shape as the inner surface is positionable against and covers the inner surface. A perimeter cover is removably placed adjacent to a perimeter edge of the plate and extends over and along the perimeter edge. The perimeter cover releasably retains the canvas in abutment with the plate. The perimeter cover has an opening therein aligned with the canvas. Art indicia are positioned on the canvas.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front is a front view of the present invention.

FIG. 4 is a front perspective of the present invention.

FIG. 9 is a rear and bottom perspective view of the present invention.

DESCRIPTION OF THE PREFERRED EMBODIMENT

Figure 1:
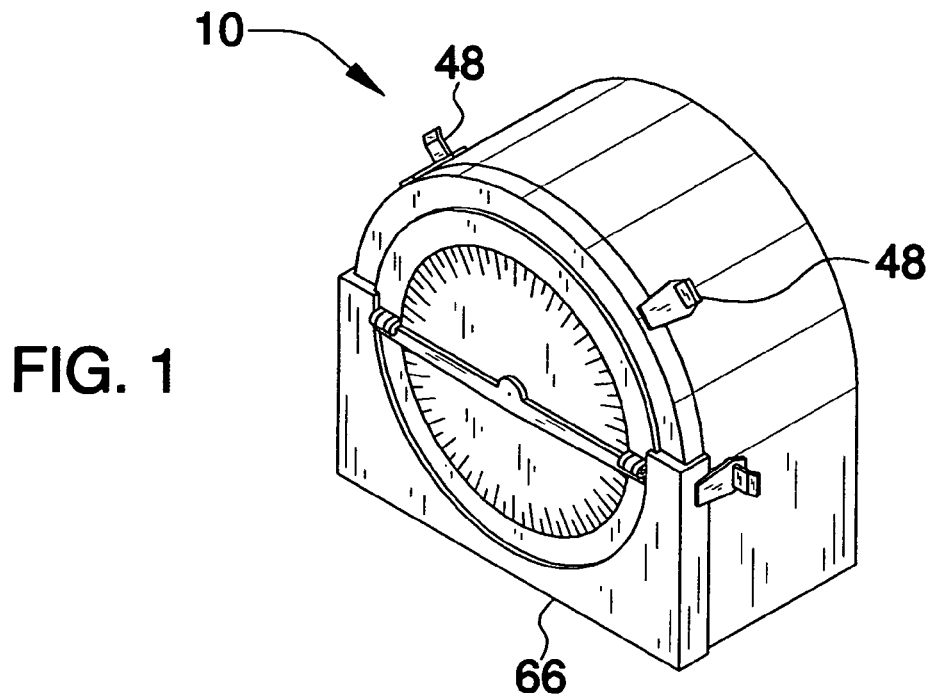
FIG. 1 is a front perspective view of a perspective painting aid assembly according to the present invention.
Figure 2:
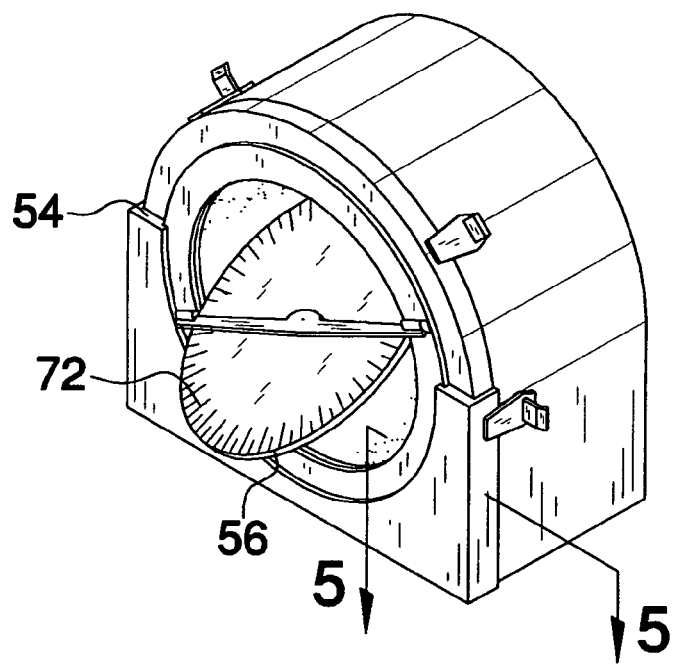
FIG. 2 is a front perspective view of the present invention.
Figure 5:
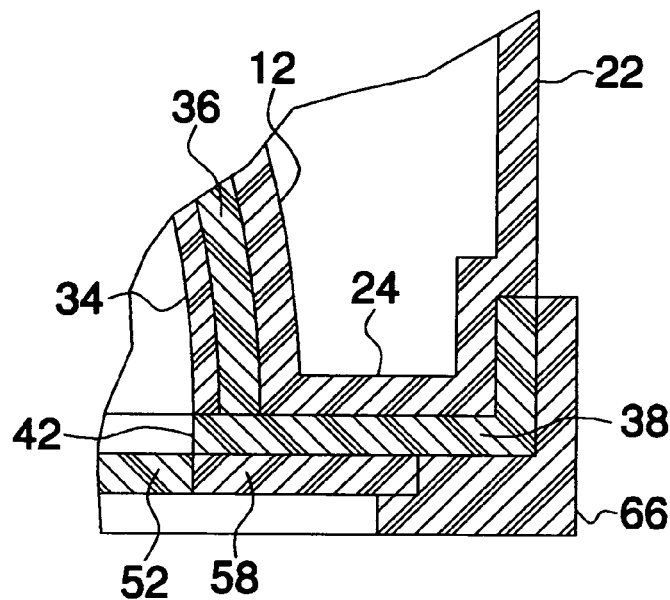
FIG. 5 is a cross-sectional view taken along line 5-5 of FIG. 2 of the present invention.
Figure 6:
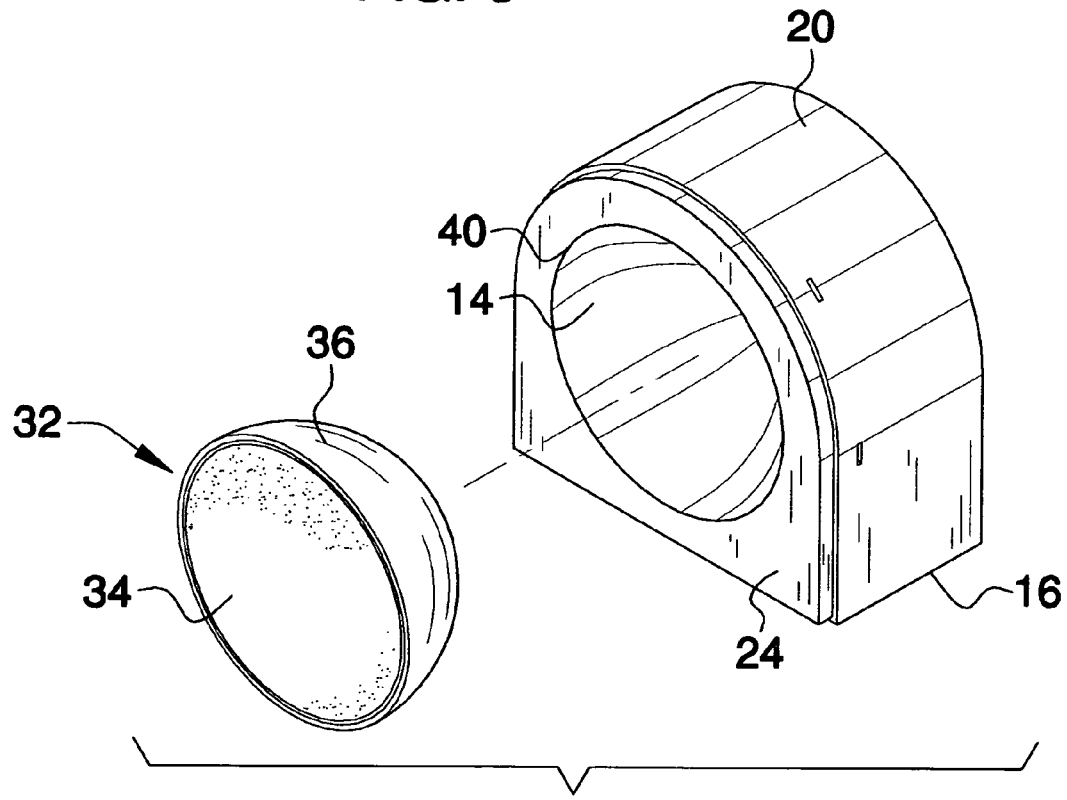
FIG. 6 is an expanded front perspective view of the present invention.
Figure 7:
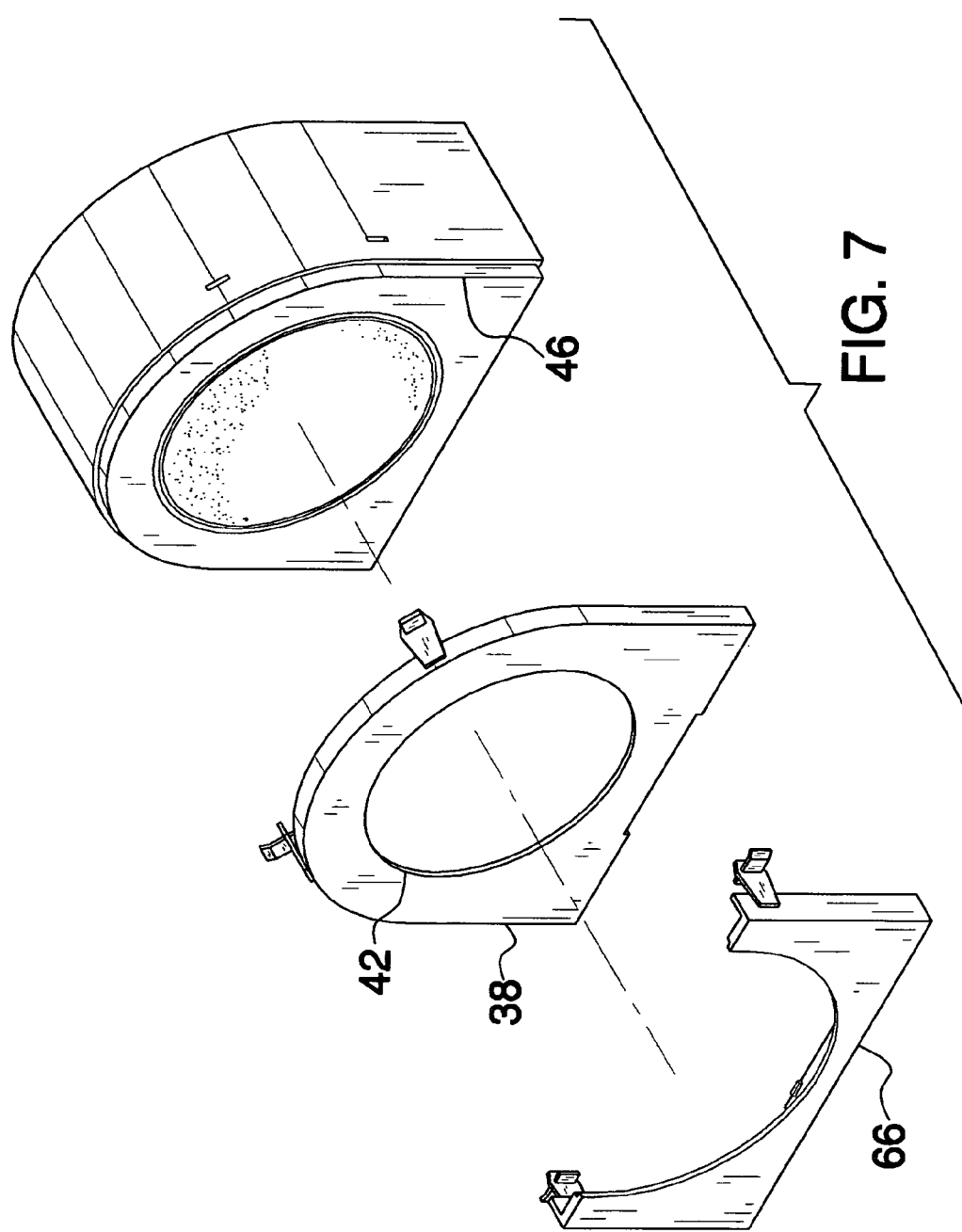
FIG. 7 is an expanded front perspective view of a perspective painting aid assembly according to the present invention.
Figure 8:
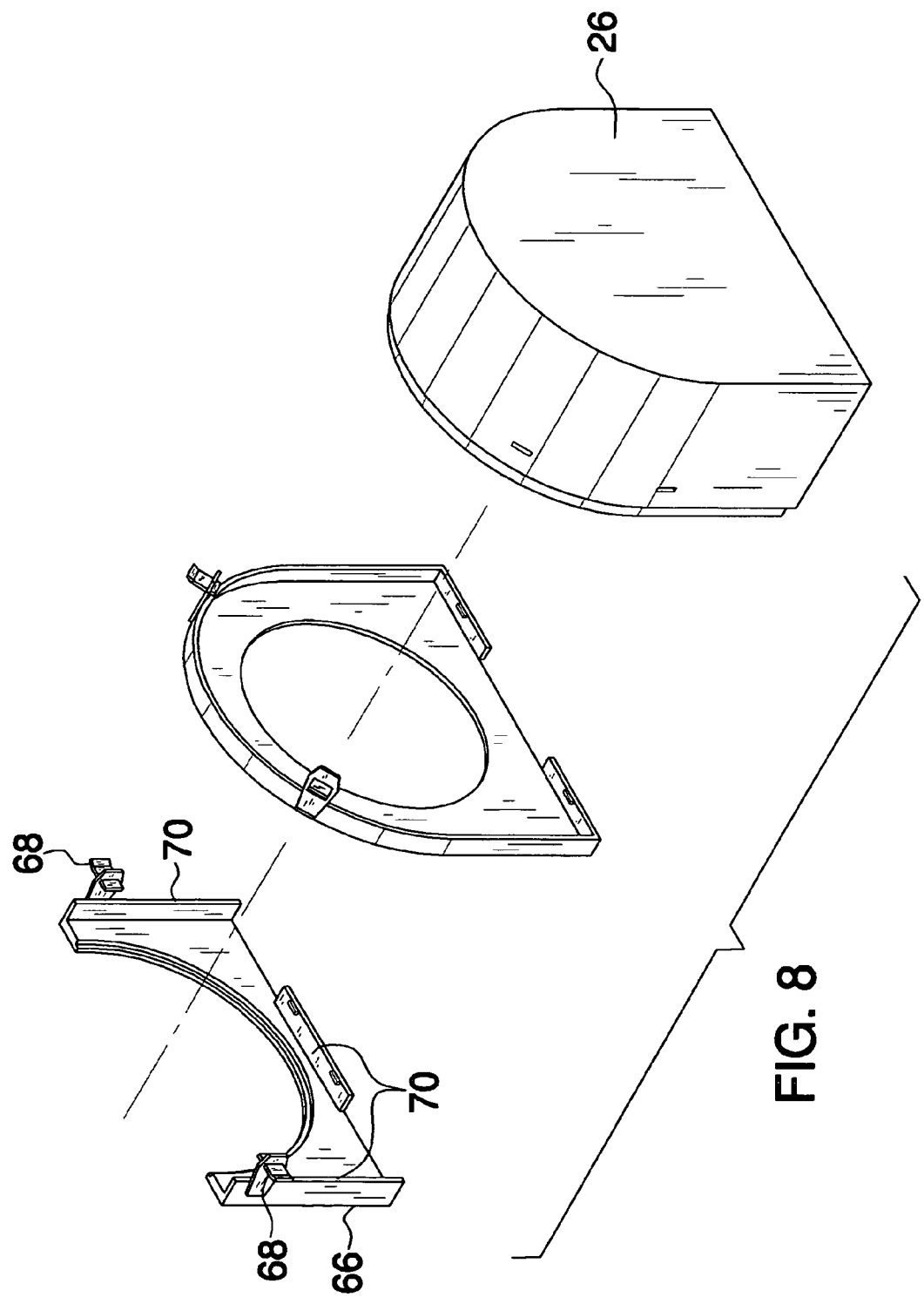
FIG. 8 is a rear and top perspective view of the present invention.

With reference now to the drawings, and in particular to FIGS. 1 through 9 thereof, a new perspective aid device embodying the principles and concepts of the present invention and generally designated by the reference numeral 10 will be described.

As best illustrated in FIGS. 1 through 9, the perspective painting aid assembly 10 includes a plate 12 that has hemispherical shape. The plate 12 has a concave inner surface 14. A vertical support 16 is attached to the plate 12. The vertical support 16 includes a housing that has a bottom wall 18, a top wall 20 and a peripheral wall 22 that is attached to and extends between the top 20 and bottom 18 walls. The peripheral wall 22 includes a front wall 24, a back wall 26, a first side wall 28 and a second side wall 30. The plate 12 extends into and is mounted in the front wall 24 so that the inner surface 14 faces outwardly of the front wall 24.

A rigid canvas 32 having generally a same size and shape as the inner surface 14 is positionable against and covers the inner surface 14. The rigid canvas 32 may include a conventional canvas material 34 attached to a cardboard backing 36 wherein the cardboard backing 36 has a hemispherical shape.

A perimeter cover 38 is removably placed adjacent to a perimeter edge 40 of the plate 12 and extends over and along the perimeter edge 40 of the plate 12. The perimeter cover 38 releasably retains the canvas 32 in abutment with the plate 12. The perimeter cover 38 has an opening 42 therein aligned with the canvas and has a diameter generally equal to an inner diameter of the canvas 32 to ensure that the entire canvas 32 is accessible. A peripheral flange 44 is attached to the cover 38 and is extendable and along an outer edge 46 of the front wall 24. A plurality of couplers 48 is configured to releasably secure the perimeter cover to the vertical support 16. The couplers 48 each include a male member attached to the flange 44 and a female member extending into the top wall 20.

A great circle drawing aid 50 is removably attached to the vertical support 16. The great circle drawing aid 50 includes a circular disc 52 that has a diameter less than a diameter of the perimeter edge 40 of the plate 12. A mounting 54 rotatably positions the disc 52 adjacent to the plate 12 so that an outer edge 56 of the disc 52 may be positioned adjacent to and extended along the canvas 32. The mounting 54 includes a planar loop 58 having an outer peripheral edge 60 and an inner peripheral edge 62. The loop 58 has a circular shape. An axle 64 is rotationally coupled to the loop 58 and extends along a diameter of the loop 58. The disc 52 is attached to the axle 64 and is positionable within a plane of the loop 58. The disc 52 is coaxial with the loop 58. A saddle 66 is removably attached to the vertical support 16. The saddle 66 is configured to support the planar loop 58 so that the inner peripheral edge 62 is generally aligned with and extends along an outer edge of the canvas 32. Clips 68 attached to the saddle 66 releasably secure the saddle 66 to the vertical support 16, though these only aid lip extensions 70 on the saddle 66 that are extended along the sides of and frictionally engage the cover 38.

In use, the assembly 10 may be used with or without the great circle drawing aid 50 to assist a person in drawing perspective drawings using a curvilinear technique. When the user of the assembly 10 decides to draw a great circle on the canvas 32, the disc 52 is attached to the vertical support 16 and its edge 56 used as a guide to draw a portion of a circle on the canvas 32. The saddle 66 allows the loop 58 to be rotated with respect to the vertical support 16 to position a plane of the disc 52 at any desired angle with respect to the canvas 32. The disc 52 may also have measurement indicia 72 thereon for assisting a person in measuring the partial circle being drawn.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A canvas mounting and support apparatus for assisting a person in producing indicia in a curvilinear manner, said apparatus comprising:

a plate having hemispherical shape, said plate having a concave inner surface;

a vertical support being attached to said plate;

a canvas having generally a same size and shape as said inner surface being positionable against and covering said inner surface;

a perimeter cover being removably placed adjacent to a perimeter edge of said plate and extending over and along said perimeter edge, said perimeter cover releasably retaining said canvas in abutment with said plate, said perimeter cover having an opening therein aligned with said canvas; and wherein art indicia may be positioned said canvas.

2. The apparatus according to claim 1, wherein said vertical support includes a housing having a bottom wall, a top wall and a peripheral wall being attached to and extending between said top and bottom walls, said peripheral wall including a front wall, a back wall, a first side wall and a second side wall, said plate extending into and being mounted in said front wall such that said inner surface faces outwardly of said front wall.

3. The apparatus according to claim 2, further including a peripheral flange being attached to said cover, said flange being extendable and along an outer edge of said front wall.

4. The apparatus according to claim 3, further including a plurality of couplers releasably secure said perimeter cover to said vertical support, said couplers each including a male member attached to said flange and a female member extending into said top wall.

5. The apparatus according to claim 1, further including a great circle drawing aid being removably attached to said vertical support.

6. The apparatus according to claim 5, wherein said great circle drawing aid includes:

a circular disc having a diameter less than a diameter of said perimeter edge of said plate;

a mounting rotatably positioning said disc adjacent to said plate such that an outer edge of said disc may be positioned adjacent to and extended along said canvas.

7. The apparatus according to claim 6, wherein said mounting includes:

a planar loop having an outer peripheral edge and an inner peripheral edge, said loop having a circular shape;

an axle being rotationally coupled to said loop, said axle extending along a diameter of said loop, said disc being attached to said axle and being positionable within a plane of said loop, said disc being coaxial with said loop;

a saddle being removably attached to said vertical support, said saddle being configured to support said planar loop such that said inner peripheral edge of said planar loop is generally aligned with and extends along an outer edge of said canvas.

8. A canvas mounting and support apparatus for assisting a person in producing indicia in a curvilinear manner, said apparatus comprising:

a plate having hemispherical shape, said plate having a concave inner surface;

a vertical support being attached to said plate, said vertical support including a housing having a bottom wall, a top wall and a peripheral wall being attached to and extending between said top and bottom walls, said peripheral wall including a front wall, a back wall, a first side wall and a second side wall, said plate extending into and being mounted in said front wall such that said inner surface faces outwardly of said front wall;

a rigid canvas having generally a same size and shape as said inner surface being positionable against and covering said inner surface;

a perimeter cover being removably placed adjacent to a perimeter edge of said plate and extending over and along said perimeter edge, said perimeter cover releasably retaining said canvas in abutment with said plate, said perimeter cover having an opening therein aligned with said canvas and having a diameter generally equal to an inner diameter of said canvas, a peripheral flange being attached to said cover, said flange being extendable and along an outer edge of said front wall;

a plurality of couplers releasably secure said perimeter cover to said vertical support, said couplers each including a male member attached to said flange and a female member extending into said top wall;

a great circle drawing aid being removably attached to said vertical support, said great circle drawing aid including;

a circular disc having a diameter less than a diameter of said perimeter edge of said plate;

a mounting rotatably positioning said disc adjacent to said plate such that an outer edge of said disc may be positioned adjacent to and extended along said canvas, said mounting including;

a planar loop having an outer peripheral edge and an inner peripheral edge, said loop having a circular shape;

an axle being rotationally coupled to said loop, said axle extending along a diameter of said loop, said disc being attached to said axle and being positionable within a plane of said loop, said disc being coaxial with said loop;

a saddle being removably attached to said vertical support, said saddle being configured to support said planar loop such that said inner peripheral edge is generally aligned with and extends along an outer edge of said canvas.

* * * * *